Oct. 1, 1968 HOZUMI HIROTA ET AL 3,403,996
FERROMAGNETIC MATERIAL
Filed May 31, 1966
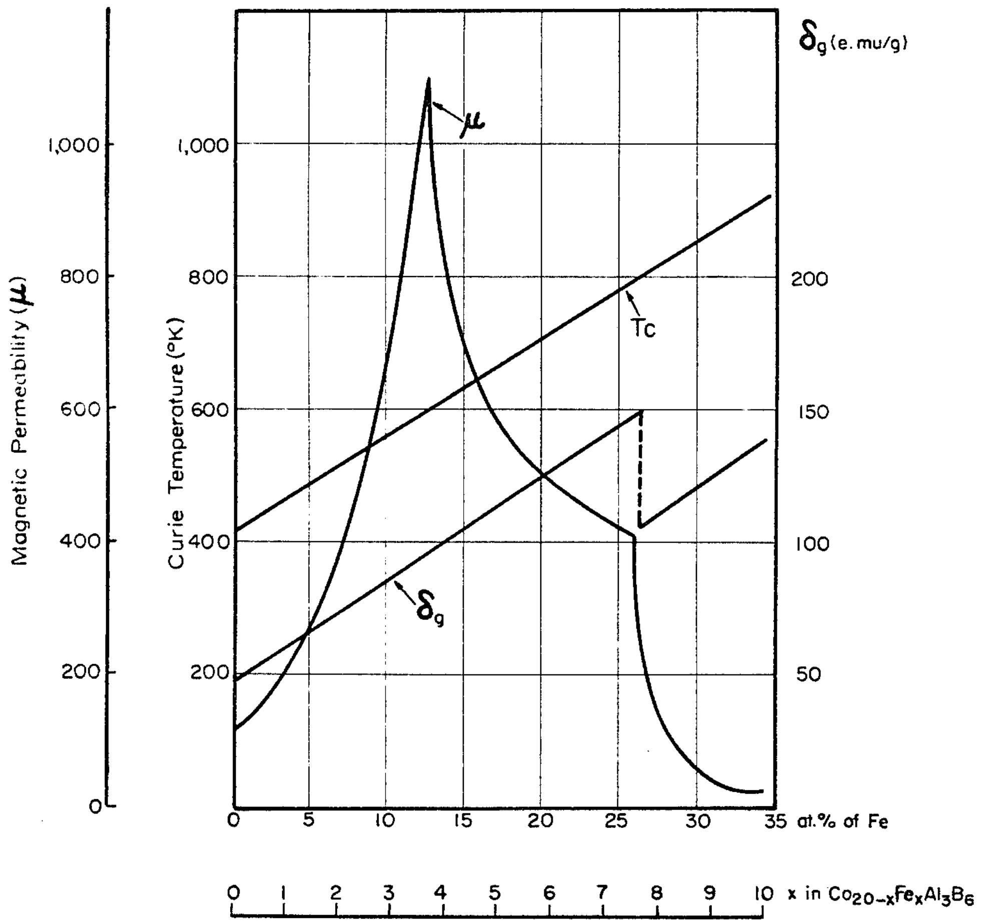
INVENTORS
HOZUMI HIROTA
AKIRA YANASE
BY Wenderoth, Lind and Ponack,
ATTORNEYS

United States Patent Office 3,403,996
Patented Oct. 1, 1968

3,403,996

FERROMAGNETIC MATERIAL

Hozumi Hirota, Neyagawa-shi, Osaka-fu, and Akira Yanase, Sendai-shi, Miyagi-ken, Japan, assignors to Matsushita Electric Industrial Co., Ltd., Osaka, Japan Filed May 31, 1966, Ser. No. 554,122
Claims priority, application Japan, Sept. 17, 1965, 40/57,603
6 Claims. (Cl. 75—170)

This invention relates to new ferromagnetic material and more particularly to ferromagnetic material characterized by high mechanical hardness, high permeability, and impressive saturation magnetization.

The per se well known soft magnetic material in an oxide form usually comprises ferrite consisting of iron oxide, divalent metal oxides and other additive oxides. Famous iron alloys known as soft ferromagnetic materials are alloys of iron-nickel, iron-aluminum, and iron-aluminum-silicon which are commercially available as "Permalloy," "Alperm" and "Sendust," respectively. The said soft magnetic materials are not entirely satisfactory from the standpoint of mechanical hardness. Recent development in the electronic industry has required a soft magnetic material having high mechanical hardness. Such material is especially desirable for use in the head chip of a video tape recorder. For practical application, such soft magnetic material is also required to have a high Curie temperature. A Curie temperature below room temperature (about 20 to 30° C.) greatly restricts practical application.

It is an object of this invention to provide magnetic material having high mechanical hardness, high magnetic permeability, a high Curie temperature and impressive saturation magnetization.

More details of this invention will become apparent upon consideration of the following description taken together with accompanying drawing in which:

The drawing is a graph illustrating saturation magnetization, Curie temperature and effective magnetic permeability, measured at a frequency of 100 c./s. (cycles per second), of the novel compositions of this invention as a function of amounts of iron.

The present invention is based on the finding that the material defined by the chemical formula $$Co_{20}Al_3B_6$$

is a ferromagnetic material having the Curie temperature of 409° K. (J. Phys. Soc. Japan, Vol. 20, 10, 1965). According to the present invention, $Co_{20}Al_3B_6$ can form a new composition $$Co_{20-x}Fe_xAl_3B_6$$

by a partial replacement of Co by Fe while maintaining the original cubic structure. The thus obtained material $Co_{20-x}Fe_xAl_3B_6$ has a face-centered-cubic structure belonging to space group $O_h^5$ Fm3M, i.e. a $Cr_{23}C_6$ type of structure.

The atom arrangement of the crystal of $Co_{20}Al_3B_6$ is as follows:

Cobalt atoms occupy point positions *f* and *h* of Fm3m, aluminum atoms occupy point positions *a* and *c* of Fm3m and boron atoms occupy point position *e* of Fm3m (Stadelmaier et al., Metall, 1962, Vol 16, pp. 773 and 1229).

The crystal phase of the new material $Co_{20-x}Fe_xAl_3B_6$ is a single phase of the $CR_{23}C_6$ type of structure in a range of *x* lower than about 10. When the substituted amount *x* is higher than 10, the obtained material results in two phases of a $CR_{23}C_6$ type and another phase. The coexistence of the latter phase impairs the desirable magnetic permeability of the novel compositions.

Referring to the drawing, which shows the magnetic properties of $CO_{20-x}Fe_xAl_3B_6$, the Curie temperature ($T_C$) increases linearly with an increase in *x* in the composition range of $x=0$ to $x=10$. The saturation magnetization ($\delta g$) shows a linear increase accompanied by a jump at about $x=8$. The mechanism of this jump is not fully understood at the present time. The magnetic permeability ($\mu$) increases with the *x* in the composition range of $x=0$ to $x=4.20$ and decreases with further increasing amount of substituted iron. The drawing establishes that the preferable composition for high permeability are those between $x=2.9$ to $x=5.0$. The Vickers' hardness of the novel compositions is measured by a per se usual method. The hardness of the novel material, 1100, is much higher than that of the conventional soft magnetic materials, Permalloy, Alperm and Sendust, i.e. ca. 500 or less.

The new material $Co_{20-x}Fe_xAl_3B_6$ exists in a $Cr_{23}C_6$ type structure and does not suffer impairment of the magnetic properties even when the amounts of aluminum atoms and/or boron atoms deviate slightly from strictly stoichiometric proportions. A large deviation of both aluminum and boron atoms, however, results in impairment of magnetic properties. Suitable atomic percentages are 6.5 to 11.2 atomic percent of aluminum and 17.0 to 25.9 atomic percent of boron.

Under consideration of the results of the drawing and of the effects of deviation of atomic percentages of boron and aluminum, the operable compositions are

| | Atomic percent |
|---|---|
| Iron | 0 to 25 |
| Aluminum | 6.5 to 11.2 |
| Boron | 17.0 to 25.9 |
| Cobalt | Balance |

Preferable compositions are

| | Atomic percent |
|---|---|
| Iron | 7.5 to 25 |
| Aluminum | 6.5 to 11.2 |
| Boron | 17.0 to 25.9 |
| Cobalt | Balance |

and still more preferable compositions in view of magnetic permeability are

| | Atomic percent |
|---|---|
| Iron | 7.5 to 15.9 |
| Aluminum | 6.5 to 11.2 |
| Boron | 17.0 to 25.9 |
| Cobalt | Balance |

The novel material of this invention can be prepared by a per se well known metallurgy technique by using either the sintering method or the melting method. Starting materials are high purity cobalt, aluminum, boron and iron, all in granular form. Commercially available granules may be used. Lumps of each constituent approximately ¼ centimeter in size are mixed in desired proportions and are placed in an alumina crucible and heated in an argon atmosphere in an induction furnace to approximately 1600° C. The melt is then allowed to cool to room temperature. The resulting ingot is a quaternary compound in a single phase of the crystal structure referred to above. The melting point of the compound is approximately 1400∼1500° C. No special cooling process is required for producing satisfactory magnetic properties. This is also a great feature of the novel material when compared with conventional magnetic material, such as Sendust or Permalloy, which requires a special cooling process. Either high or low rate of cooling produces similarly satisfactory magnetic properties in accordance with the present invention.

The sintering method can be performed as follows:

Intimate mixtures of the constituent powders are pressed into desired shape at a pressure higher than 500 kg./cm.$^2$ (kilograms per square centimeter). The higher pressure is preferable for obtaining higher density of pressed product. The pressed product is then sintered at 800° C. to 1000° C. for 1 to 200 hours in a reduced atmosphere (air) ranging from $10^{-2}$ mm. Hg to $10^{-6}$ mm. Hg or in a non-oxidizing atmosphere such as argon. Porosity of the sintered material can be controlled by adjusting pressing pressure, sintering temperature, sintering time or their combinations in a way similar to the per se well known powder metallurgy technique.

Measurement of magnetic permeability is made with a ring in a desired composition cut out from an ingot prepared by the method hereinbefore described. The ring, having a 14.5 mm. outer diameter, 5.0 mm. inner diameter and about 2 mm. thickness, is provided with Litz wire at 50 turnings for the purpose of measuring magnetic permeability in the per se usual manner.

The new compositions of this invention are inter alia very well suitable for use in the head chip of a video tape recorder.

The following examples of specific new compositions are given by way of illustration and should not be construed as limitative.

Example 1

A mixture consisting of

| | Atomic percent |
|---|---|
| Cobalt | 53.2 |
| Iron | 14.1 |
| Aluminum | 10.1 |
| Boron | 22.6 |

is melted by the method described above. Powder X-ray difffraction lines of the specimen are exactly indexed as a face-centered-cubic lattice of the $Cr_{23}C_6$ type. The specimen is in an atomic proportion indicated by the formula:

$$Co_{15.8}Fe_{4.2}Al_3B_{6.7}$$

An effective permeability of this composition is 720 at a frequency of 100 c./s.

Example 2

As a further example, a specimen having the atomic proportion $$Co_{15.8}Fe_{4.2}Al_{3.1}B_6$$

is obtained by melting a mixture consisting of

| | Atomic percent |
|---|---|
| Cobalt | 54.3 |
| Iron | 14.4 |
| Aluminum | 10.7 |
| Boron | 20.6 |

in exactly the same way as that above described. This specimen clearly exists in a single phase of the $Cr_{23}C_6$ type, and the effective permeability is 732 at 100 c./s.

Example 3

By way of further examples, samples of $$Co_{15.8}Fe_{4.2}Al_{3.2}B_{6.5}$$

are prepared in exactly the same way as that hereinbefore described. It is thus found, that $Co_{15.8}Fe_{4.2}Al_{3.2}B_{6.5}$ exhibits essentially the same magnetic properties as those of $Co_{1548}Fe_{4.2}Al_3B_6$.

Change may be made within the scope and spirit of the claims, and some of the improvements may be used without others.

What is claimed is;

1. A ferromagnetic material with a $Cr_{23}C_6$ type of crystal structure comprising essentially not more than

| | Atomic percent |
|---|---|
| Iron | 35 |
| Aluminum | 6.5 to 11.2 |
| Boron | 17.0 to 25.9 |
| Cobalt | Balance |

said crystal structure having such an atom arrangement that point positions *f* and *h* of Fm3m are occupied by cobalt atoms and iron atoms, point positions *a* and *c* of Fm3m are occupied by aluminum atoms, and point position *e* of Fm3m is occupied by boron atoms.

2. A ferromagnetic composition as defined in claim 1 consisting essentially of:

| | Atomic percentage |
|---|---|
| Co | 44.0–61.5 |
| Fe | 7.5–25.0 |
| Al | 6.5–11.2 |
| B | 17.0–25.9 |

3. A ferromagnetic composition as defined in claim 1 consisting essentially of:

| | Atomic percentage |
|---|---|
| Co | 53.1–61.5 |
| Fe | 7.5–15.9 |
| Al | 6.5–11.2 |
| B | 17.0–25.9 |

4. A ferromagnetic composition according to claim 1, said composition corresponding to the formula $$Co_{15.8}Fe_{4.2}Al_3B_{6.7}$$

5. A ferromagnetic composition according to claim 1, said composition corresponding to the formula $$Co_{15.8}Fe_{4.2}Al_{3.1}B_6$$

6. A ferromagnetic composition according to claim 1, said composition corresponding to the formula $$Co_{15.8}Fe_{4.2}Al_{3.2}B_{6.5}$$

References Cited

UNITED STATES PATENTS

| | | | |
|---|---|---|---|
| 2,542,962 | 2/1951 | Kinsey | 75—170 |
| 2,856,281 | 10/1958 | Cremer et al. | 75—170 |
| 3,206,338 | 9/1965 | Miller et al. | 148—31.55 |
| 3,211,592 | 10/1965 | Masumoto et al. | 75—170 |

RICHARD O. DEAN, *Primary Examiner.*